United States Patent [19]

Yee et al.

[11] 4,092,599
[45] May 30, 1978

[54] ANNUNCIATOR COMMUNICATION SYSTEM

[76] Inventors: Werner Yee, 210 Sebastian Dr., Millbrae, Calif. 94030; Victor Y. Lain, 948 Leith Ave., Santa Clara, Calif. 95054

[21] Appl. No.: 745,078

[22] Filed: Nov. 26, 1976

[51] Int. Cl.² .......................... H04B 5/04; H04B 3/54; G09F 9/32
[52] U.S. Cl. .................................. 325/55; 325/41; 325/64; 340/311
[58] Field of Search ................ 325/55, 64, 39, 51, 325/41; 340/311, 312

[56] References Cited

U.S. PATENT DOCUMENTS

| | | | |
|---|---|---|---|
| 2,812,509 | 11/1957 | Phelps | 325/55 |
| 3,846,783 | 11/1974 | Apsell et al. | 325/55 |
| 3,944,724 | 3/1976 | Kilby et al. | 325/64 |
| 3,976,995 | 8/1976 | Sebestyen | 340/311 |
| 3,984,775 | 10/1976 | Cariel et al. | 340/311 |

*Primary Examiner*—Robert L. Griffin
*Assistant Examiner*—Marc E. Bookbinder
*Attorney, Agent, or Firm*—Linval B. Castle

[57] ABSTRACT

An annunciator communications system in which any one of a plurality of identical transmitting-receiving units can communicate to the rest through minimum communication links, such as power transmission lines, piping, building structures, or the like. Each unit contains a keyboard encoder controlling the transmitting section of a universal asynchronous receiver/transmitter integrated circuit to generate a modulated 200 Khz output. The receiver section of the integrated circuits in all units on the communications link receives the binary encoded data and passes it to a decoder and multiplexer that controls the input to a six-digit calculator integrated circuit that generates data output signals to a six-digit numeric display.

10 Claims, 3 Drawing Figures

4,092,599

ANNUNCIATOR COMMUNICATION SYSTEM

BACKGROUND OF THE INVENTION

This invention relates generally to two-way annunciator signaling and communication display systems, and more particularly to a system employing a plurality of identical transmitter-receiver units, each capable of communication with the others over available power distribution lines or other minimum available transmission media that is usually avoided because the inherent interference and low signal-to-noise ratio generally results in unintelligible communications.

Annunciator communication systems are well-known and are often used in hospitals, large retail establishments, industrial plants and other general business offices. Nearly all presently available communications systems are linked together by a cabling system, the size and complexity of which depends principally upon the number of stations in the system. If it is desired to enlarge or alter the system, it is obviously necessary to install additional cabling or to re-route existing cabling, often a very complex and costly task. Service of such systems is likewise difficult and costly.

U.S. Pat. No. 3,918,000, assigned to the assignee of the present invention, describes an annunciator system that does not require interconnecting communication cables but makes use of the AC power distribution lines for its data signal link. While that system is quite adequate for many applications, it is extremely complex and involves the use of many integrated circuit components as well as passive components. Furthermore, that system does not digitally reject signal perturbations but depends solely on its analog circuitry to filter out unwanted noise and interference.

The system of the present invention also makes use of the AC power lines but employs commercially available LSI components that incorporate circuitry that recognizes and rejects signal perturbations, both analog and digital, thus assuring reliability under noise and interference conditions that would render the prior art systems inoperable.

The present system includes a plurality of identical transmitter-receiver units, each of which is physically small and may, if desired, be mounted to the wall near an existing electrical outlet which provides both the power to the unit and the communication link to the other units. Each unit may have the appearance of a small hand-held calculator in that it is provided with a six-digit LED numeric display and a 12-key keyboard containing numeric keys 0-9, a CLEAR key, and an ALARM key. As will be described in detail, the internal circuitry of each unit has a capacity for handling much more data that can be displayed on the six-digit display, thus additional signaling or communications may be available if desired.

To operate the signaling and communication system of the invention, the operator merely keys in the desired addressee and message, which are represented by a number code and which are displayed on all units, including the transmitting unit. The unit will display six digits of 10 numbers each, or a total of one million combinations. The particular numbers displayed will represent a code known only to those employing a particular system, thus assuring the security of the communications. For example, the first two numbers of the six-digit message may represent the station or employee number of the addressee; the second two numbers displayed may constitute a message, such as "come immediately to"; and the third pair of numbers may represent the station of employee number of the sender. After the full communication is keyed in to the transmitting unit, the operator may then depress the ALARM key, labeled "A", and a small buzzer sounds in each unit. When the addressee receives his displayed communication, he will depress a CLEAR key, labeled "C", which will clear his display as well as all other units which displayed the message. In this way, the addressee acknowledges receipt of the message and the sender will be assured that his message was received. If the addressee does not clear the system, the sender may continue to depress the alarm key in an attempt to attract the addressee or, the sender may elect to clear the system by depressing his clear key, thus removing the message from all displays.

Briefly described, each unit of the system includes a keyboard coupled to a digital encoding circuit which applies the encoded message into the input holding register of the transmitting section of a commercially available integrated circuit chip known as a universal asynchronous receiver/transmitter, or UART, which serially transmits a binary word representing each keyed-in number. The receiver section of all units, including the transmitting unit, contains complex circuitry for rejecting input noise and distortion, and receives, shapes, and loads the signal into a register which shifts it out, in parallel, through a decoder and multiplex circuit to a commercially available integrated circuit calculator chip which controls a conventional six-digit numeric LED display.

BRIEF DESCRIPTION OF THE DRAWINGS

In the drawings which illustrate a preferred embodiment of the invention.

DESCRIPTION OF THE PREFERRED EMBODIMENT

Figure 1:
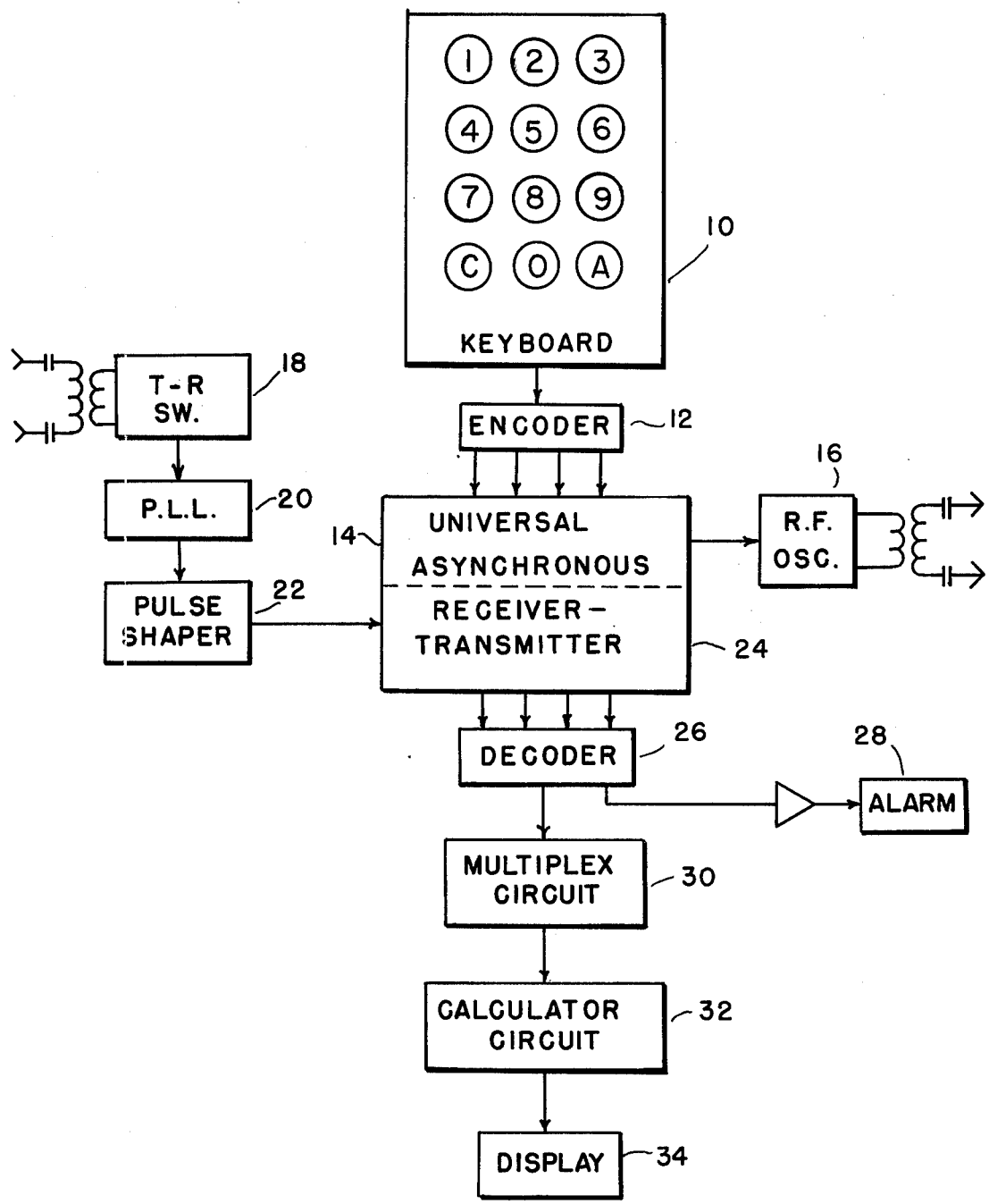
FIG. 1 is a block diagram of the circuitry in each unit of the annunciator communication system.

Referring now to the block diagram illustrated in FIG. 1, a signal transmitting section of each unit comprises a keyboard 10 having ten numeric keys, 0-9, a CLEAR key, C, and an ALARM key, A. Each key of the keyboard 10 is coupled to an analog-to-digital encoder circuit 12 which converts each of the 12 key positions into a four-bit word that is applied to the transmitting section 14 of a universal asynchronous receiver/transmitter, or UART. The UART is a commercially available LSI circuit, such as a type S1757 manufactured by American Microsystems, Inc., Santa Clara, California, or the equivalent. As will be discussed in detail in connection with FIG. 2, the transmitting section 14 receives each word of binary input data in parallel and transmits each word, as it is received, to modulate a radio frequency oscillator 16, the output of which is coupled for transmission through the AC power distribution system to the receiving sections of all other units.

The RF signal transmitted through the AC distribution system is received by the receiver section of an identical unit and applied to a transmit/receive switch 18 which blocks reception of the modulated RF signal only to the transmitting unit while it is transmitting. Therefore, all receivers, other than the transmitting receiver, will pass the RF input signal to a phase locked loop 20 which demodulates the RF and applies the binary word through a pulse shaper 22 to the input register of the receiving section 24 of the UART. When the input register of the receiving section 24 is completely loaded, it is checked for digital signal errors such as framing or parity errors. If such errors are found in the received signal, the data is prevented from entering subsequent circuitry; if no errors arise, the data is shifted out in parallel to a standard four-to-16 line decoder 26. One of the 16 output lines of decoder 26 is connected to actuate the alarm 28 while the remaining lines are applied to multiplex circuitry 30, which includes a group of bilateral switches suitably connected to energize appropriate input lines to the calculator circuit 32. Calculator circuit 32 is a commercially available MOS/LSI six-digit calculator chip, such as a model MM5736, manufactured by National Semiconductor Corporation, Santa Clara, California, or the equivalent. None of the four function inputs to the calculator circuit 32 is used. Multiplex circuitry 30 is connected to activate only the inputs to the calculator circuit 32 for representing the numerals 0-9 and Clear. The selected numerals are then applied to a standard six-digit LED numeric display 34.

Figure 2:
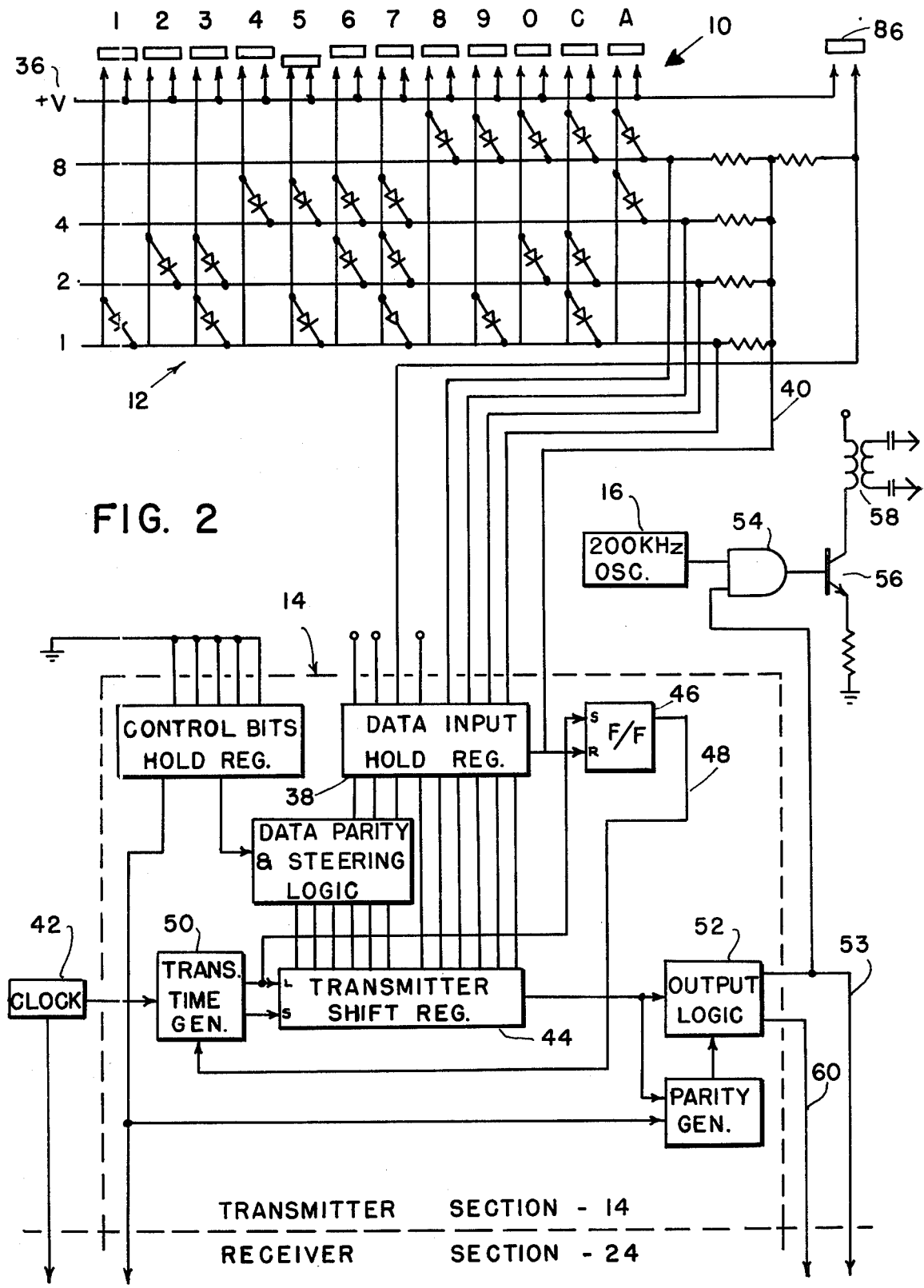
FIG. 2 is a detailed block diagram of the transmitter section in each unit.

Keyboard 10, encoder 12, transmitting section 14 and RF oscillator 16 are illustrated in detail in FIG. 2. As shown in FIG. 2, the depression of a key in keyboard 10 closes a circuit between a source of positive voltage 36 and the input lines to an analog-to-digital encoder 12. In the encoder 12, the vertical input lines are coupled through appropriate diodes to the horizontal output lines so that each key of the keyboard 12 is represented by a unique four-bit binary number that is applied in parallel to the four least significant digit positions of the data input holding register 38 in the transmitter section 14 of the UART. As previously indicated, this receiver/transmitter is a commercially available LSI circuit; the principal elements of its transmitting section 14 are reproduced in FIG. 2, while portions that are not actively used in this invention have been omitted from the figure.

When any of the keys of the keyboard 10 is depressed, the positive voltage from the voltage source 36 is also applied to the transmitter data word input strobe line 40, which is coupled to the enabling input of holding register 38 so that upon occurrence of the next clock pulse from system clock 42, the data in holding register 38 will be transferred in parallel to the transmitter shift register 44. The enabling signal from strobe line 40 also resets the flip-flop 46, the true output of which goes high when holding register 38 has been emptied and is ready for new data from the encoder 12. This "register empty" signal is applied through a conductor 48 to the input of a transmitter time generator 50 which operates in accordance with the pulses from the system clock 42 to control the loading and the shifting of the transmitter shift register 44. Therefore, upon the occurrence of a shift signal from the time generator 50, the shift register 44 will clock out its data in series through the output logic 52 to the AND-gate 54 where the output signal is gated with the output of the 200 KHz oscillator 16 into a transistor amplifier 56 which is in series with the transmitter output coils 58. Although not used in connection with the transmitter section 14, the output logic 52 generates an output signal on the end of character flag conductor 60, which will be used to control the transmit-receive switch in the receiver section, as will be subsequently described.

Figure 3:
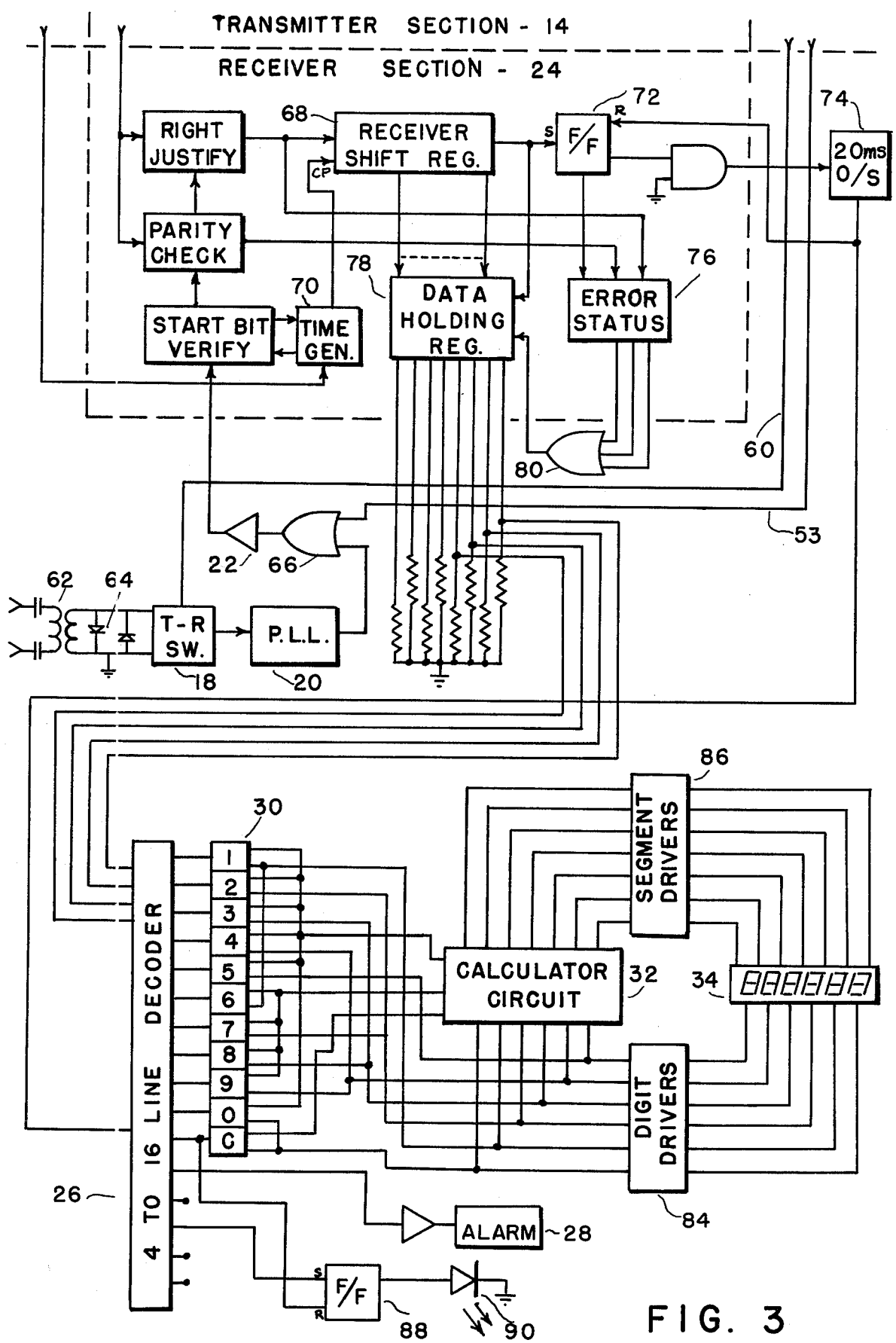
FIG. 3 is a detailed block diagram of the receiver section in each unit.

As illustrated in the detailed block diagram of FIG. 3, a signal received through the power distribution lines is received by the input transformer 62 where the signal is amplitude-limited by a pair of oppositely connected parallel diodes 64 and applied to the transmit-receive switch 18. As previously indicated, transmit-receive switch 18 is a bilateral switch and is controlled by the signal on the end of character flag conductor 60 and grounds the input signal during the operation of the transmitter section 14. When the transmit-receive switch 18 is open, the RF signal is applied to the phase locked loop 20 where it is detected into a serial binary word that is applied through OR-gate 66 to amplifier 22, which is carefully designed to shape the pulses from the phase locked loop 20 into a rectangular form suitable for applying to the input of the receiver section 24. If the transmitter section 14 is being operated, the signal on the end of character flag conductor 60 will actuate the transmit-receive switch 18 so that the RF input signal will be grounded and will not reach the phase locked loop 20. However, during operation of transmitter section 14, the operator of the unit would desire to observe his transmitted data on his own display; therefore, the binary output of the transmitter section 14 is applied through the conductor 53 to the OR-gate 66 so that the receiver and display section of a unit is monitoring its own transmission prior to the time the transmitted signal is converted by the RF oscillator 16.

The signal applied to the receiver section 24 of the universal asynchronous receiver/transmitter is clocked into the receiver shift register 68 in accordance with the signals from the receiver time generator 70 which is under the control of the system's clock 42. When the input shift register 68 has been filled, the register produces an output signal that sets the flip-flop 72. Flip-flop 72 then produces an output signal which is applied to a one-shot multivibrator 74, the output of which resets the flip-flop 72 after a 20 millisecond delay. Flip-flop 72 also signals the error status register 76 if the receiver shift register 68 fails to become filled.

When filled, the receiver shift register 68 loads its data in parallel into the data output holding register 78 where it continues to be held without appearing at the register output if the error status register detects a parity error, a framing error, or an incomplete loading signal from the flip-flop 72. If no errors are present, the output lines of error status register 76, which are coupled to the input of the OR-gate 80, will generate an enabling signal that transfers the data from the output holding register 78 to the input terminals of the four-to-16 line decoder 26. Decoder 26 accepts the four-bit binary coded word from the UART receiver section 24 and, when gated by a signal from the one-shot 74, converts it into 16 individual exclusive output signals.

Although 16 output lines are available from the binary coded four-line input, the transmitter keyboard contains only 12 keys and, therefore, only 12 output lines from the decoder 26 are employed — 10 for the numerical output of 0-9, one for Clear, and one for Alarm. The 12th output of the decoder 26 corresponds to the binary number 12 that may be selected by depressing the "A" key of the keyboard 12. Therefore, whenever the "A" key is depressed, a signal will be emitted from the 12th terminal of the decoder 26 and will be amplified by amplifier 82 to operate the alarm 28, which is preferably an audible alarm buzzer or bell. The alarm 28 may contain additional electronic circuitry to generate a tone signal, for example, to be applied to a speaker, or circuitry to shut it off and/or reset it after a predetermined time interval.

As previously indicated, the calculator 32 is a MOS/LSI six-digit calculator and in the preferred embodiment may be a type MM5736 manufactured by National Semiconductor Corporation. The calculator 32 has seven segment outputs designated "$a$" through "$g$", six digit outputs designated "1" through "6", and three keyboard scan inputs designated $k1$, $k2$, and $k3$. The closing of a circuit between the keyboard scan input k1 and the digit output "1" will produce the numeral "0" at the output of calculator 32. The numeral "1" is generated by a connection between $k1$ and digit 2; $k1$ to $d3$ produces "2"; $k1$ to $d4$ produces "3"; $k1$ to $d6$ produces "5"; $k2$ to $d2$ produces "6"; $k2$ to $d4$ produces "8"; $k2$ to $d5$ produces "9"; and $k3$ to $d1$ clears the entire calculator chip. Other connections between $k3$ and digits 3, 4, 5 and 6 will generate the various functions of the calculator and are not used in this invention. The purpose of the calculator chip is to produce a numeral in the calculator input register each time a key on the keyboard 10 is depressed. Therefore, the output lines of the decoder 26 are applied to the bilateral switches 30 which interconnect appropriate keyboard scan inputs of the calculator 32 with the digit lines as dictated by a key selection of keyboard 10. That is, if key No. 5 of keyboard 10 is depressed, the decoder 26 would actuate only the fifth bilateral switch to close the circuit between the scan input $k1$ and the digit line 6. If this is the first number depressed after the system has been cleared, the calculator chip 32 will transmit a signal through the digit line 1 and through a conventional digit driver 84 to the first, or right-hand, digit position in the numeric display 34. At the same time, calculator 32 would energize the appropriate segment outputs into segment driver 86 so that the appropriate segments in that first digit would be displayed. Upon depression of the second number by the input keyboard, a second binary number would be generated by the encoder 12 and applied to the transmitter section 14 of the particular unit being operated. All other units coupled to the communications media would detect that signal, process it in the receiving secton 24, apply it to the decoder 26 and the multiplexer 30 and the calculator 32 would, at that point, shift the first keyed-in number to the second position and display the new number in the right-hand position of the display 34.

As previously mentioned, the data input holding register 38 in the UART transmitter section 14 of FIG. 2 and the decoder 26 of FIG. 3 have a larger capacity than is necessary for the 12-key keyboard 10. If desired, additional signaling or communications functions may be added, such as, for example, the addition of signal lights that may indicate a degree of urgency, or additional signaling or system controlling functions. Such additional functions may be accomplished by enlarging the keyboard 10 and encoder 12 of FIG. 2, and the multiplexer 30 of FIG. 3 or, if only three or four additional keys are desired, by merely adding one or more keys, such as the additional key 86 of FIG. 2 which, when depressed, will directly enter a signal into one of the unused sections of the UART data input holding register 38. After being transmitted to the other identical units, this additional signal will be reproduced from the corresponding section of the decoder 26 of FIG. 3 where it may, for example, set a bistable latch 88, the output of which may energize a LED panel indicator 90. the latch 88 may be coupled to the "clear" output of the decoder 26 so that the indicator 90 will be extinguished when the calculator 32 is cleared by depressing the clear key, C, on keyboard 10.

What is claimed is:

1. An annunciator communications system comprising a plurality of identical transmitter-receiver units each having the capability of signaling and communicating with all of said units, each of said units comprising:
   data input means for entering data to be transmitted and for converting said data into corresponding binary coded data signals, said data input means including a plurality of manually operated switches;
   transmitting means coupled to said data input means for receiving each of said data signals in parallel from said input means and for transmitting said data signals in series through a communications medium;
   receiving means for receiving an input signal from said communications medium, said receiving means including circuitry for detecting and decoding said binary signals and for producing an output signal at one of a plurality of output terminals, each of said output terminals corresponding to one of said plurality of switches in said data input means; and
   display means coupled to said receiving means for visibly displaying a character represented by said output signal, said display means including means for displaying additional characters and for continuing the display of said characters until said display means is cleared by a signal originating at said data input means.

2. The system claimed in claim 1 wherein said data input means includes manually operated switches representing the numbers 0-9 and the functions "clear" and "alarm".

3. The system claimed in claim 2 wherein said transmitting means and said receiving means include the transmitting and receiving sections, respectively, of a universal asynchronous receiver/transmitter.

4. The system claimed in claim 2 wherein said transmitting means includes circuitry for modulating an RF signal with said data signals.

5. The system claimed in claim 4 wherein said receiving means includes circuitry for detecting parity and overrun errors in said binary coded data signals and for preventing the passage of erroneous signals from said receiving means.

6. The system claimed in claim 5 wherein said display means includes the circuitry of a digital calculator having a plurality of input terminals, the particular interconnection of said input terminals causing the display of particular numerals.

7. The system claimed in claim 6 wherein said receiving means further includes multiplex circuitry coupled to the output terminals of said decoder and to the input terminals of said digital calculator circuitry of interconnecting particular output terminals to said calculator circuitry.

8. The system claimed in claim 7 further including an audible alarm coupled to respond to an output signal at a particular one of said plurality of output terminals of said decoder.

9. The system claimed in claim 8 further including signaling circuitry coupled to an output terminal of said decoder and responsive to the actuation of an additional signaling switch in said data input means, said signaling circuitry including a latch set by a signal on the corresponding output terminal of said decoder and reset by a signal that causes said calculator circuitry to be cleared.

10. An annunciator communications system comprising a plurality of identical transmitter-receiver units each of said units having the capacity to signal and communicate with all of said units, each of said unit comprising:
- an input keyboard comprising a plurality of switches for entering data to be transmitted;
- encoding means coupled to said keyboard for converting the input data into corresponding binary coded data;
- digital transmitter logic circuitry coupled to said encoding means, said circuitry including register means for receiving said binary coded data from said encoding means and for serially shifting out said data through its output terminal;
- means coupled to the output terminal of said digital transmitter logic circuitry for generating and transmitting an RF signal modulated with said binary coded data;
- receiving means for receiving an RF input signal modulated with said binary coded data, and for detecting and shaping the detected signal into a signal representing said binary coded data;
- signal checking means coupled to said receiving means for testing said signal representing said binary coded data for parity and overrun errors;
- digital receiver logic circuitry coupled to said receiving means and said signal checking means, said receiver logic circuitry including register means for serially receiving said binary coded data and for outputting said data in parallel under the control of said signal checking means;
- decoding circuitry coupled to said receiver logic circuitry for decoding said binary coded data and for producing an output signal at one of a plurality of output terminals, each of said output terminals corresponding to one position of said input keyboard; and
- display means coupled to said decoding circuitry for converting the output signal at each of said plurality of output terminals into a corresponding numeric character and for displaying said character, said display means including circuitry for displaying a plurality of additional numeric characters and for continuing the display of said characters until said display means receives a signal to clear said display.

* * * * *